May 13, 1969   W. KLEIN   3,443,862
ANASTIGMATIC MEDIUM-POWER MICROSCOPE OBJECTIVE
Filed June 25, 1964
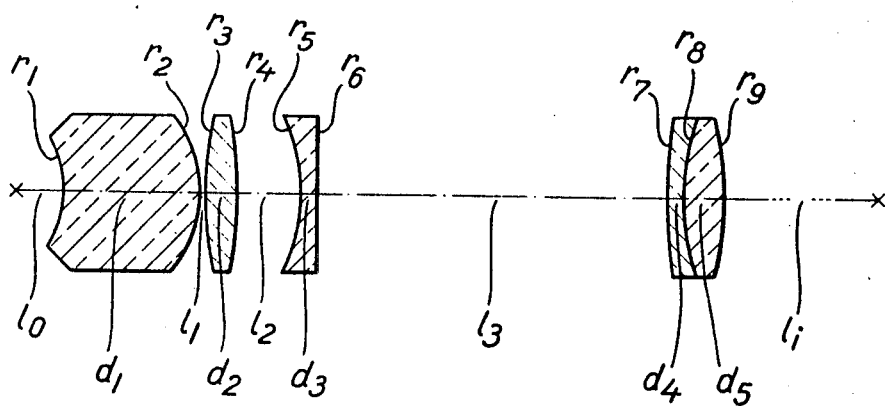
INVENTOR
WALTER KLEIN
BY
AGENT 3,443,862
ANASTIGMATIC MEDIUM-POWER
MICROSCOPE OBJECTIVE
Walter Klein, Wissmar, Kreis Wetzlar, Germany, assignor to Ernst Leitz G.m.b.H., Wetzlar, Germany, a corporation of Germany
Filed June 25, 1964, Ser. No. 377,914
Claims priority, application Germany, July 9, 1963, L 45,293
Int. Cl. G02b 9/52, 9/60
U.S. Cl. 350—220
4 Claims

ABSTRACT OF THE DISCLOSURE

The invention is a microscope objective providing a flattened image field corrected for astigmatism and distortion The objective comprises along the axis from the object plane to the image plane a thick meniscus lens, a converging singlet lens, a divergent singlet lens and a cemented converging doublet lens. The axial distance between the divergent singlet lens and the apex of the doublet lens on the side facing the image is at least one third the distance betwen the object and said apex. The curvature of the image field is corrected by the thick meniscus lens; the two singlet lenses correct astigmatism and distortion; and the cemented doublet lens corrects the spherical aberrations and the coma.

---

The present invention relates to a microscope objective providing a flattened image field, and more particularly an anastigmatic objective with a magnification of about 5:1 to about 15:1 and/or with a focal length of about 30 mm. to about 10 mm.

In microscope objectives of this type, it has been proposed to use a thick negative meniscus lens as the objective's front lens next to the object. The image errors created by such a front lens, particularly astigmatism, have been corrected by corrective lenses at the image side of the objective. This, however, causes considerable difficulties in small- or medium-power objectives and/or in objectives with relatively large focal lengths since the focal point at the side of the image, which is the locus of the pupil in microscope objectives, is then positioned too far at the side of the image. Therefore, conventional objective constructions of this type have been very expensive because they are complicated.

It is the primary object of the present invention to overcome these disadvantages and to provide microscope objectives of the indicated power and focal length range with good correction and a small number of lenses.

This and other objects are accomplished by making the objective of two groups of lenses. The axial distance between the two groups of lenses is at least one third of the axial distance between the object and the apex of the objective lens facing the image projected by the objective. The first group of lenses consists of a negative meniscus lens of considerable axial thickness next to the object to constitute the front lens of the objective and two simple lenses, one being converging and the other one being diverging. The second lens group consists of a cemented converging doublet lens member.

With an objective construction of this type, the image errors are corrected in the following manner:

The curvature of the image field $\Sigma P$ is corrected with the front lens; the two simple lenses of the first group correct the astigmatism and distortion; and the cemented doublet lens at the side of the image corrects the spherical aberrations and the coma.

By appropriately choosing the axial distance between the two simple lenses of the first group, it is possible to position the focal point on the side of the image close to, or within, the second lens group whereby a good limitation of the aperture is possible. This makes a good illumination feasible.

The accompanying drawing and the following tables show the preferred embodiments of this invention, the single figure illustrating the lenses and the tables giving two constructional examples useful for different focal length ranges.

In the drawing, the specification and the claims, $l_i$ designates the axial distance from the last objective lens to the image plane.

With a focal length $f$ between 20 mm. and 30 mm., the respective focal lengths $f_1$, $f_2$, $f_3$, and $f_4$ and the respective axial distance between the object and the negative meniscus lens, and between successive ones of said lenses $l_0$, $l_1$, $l_2$, and $l_3$ are as follows:

TABLE I $1.4f < f_1 < 2.0f$
$0.6f < f_2 < 1.1f$
$0.5f < -f_3 < 0.9f$
$1.1f < f_4 < 1.7f$ $0.08f < l_0 < 0.18f$
$0 < l_1 < 0.2f$
$0 < l_2 < 0.4f$
$0.6f < l_3 < 1.2f$

In this embodiment, the successive radii of curvature $r_1$, $r_2$, $r_3$, $r_4$, $r_5$, $r_6$, $r_7$, $r_8$, and $r_9$ and the successive axial thicknesses $d_1$, $d_2$, $d_3$, $d_4$, and $d_5$ of said lenses, startnig from the object, are as follows:

TABLE IIa $0.25f < d_1 < 0.45f$
$0.04f < d_2 < 0.2f$
$0.02f < d_3 < 0.3f$
$0.05f < (d_4 + d_5) < 0.4f$ $0.15f < -r_1 < 0.4f$
$0.2f < -r_2 < 0.45f$
$0.7f < r_3 < 1.3f$
$0.7f < -r_4 < 1.3f$
$0.3f < -r_5 < 0.7f$
$r_6 > \pm 3f$
$1.0f < r_7 < 2.0f$
$0.4f < r_8 < 0.9f$
$0.6f < -r_9 < 1.2f$ and the indices of refraction $n_1$, $n_2$, $n_3$, $n_4$, and $n_5$ for the $e$ line of the spectrum and the dispersive indices $\nu_1$, $\nu_2$, $\nu_3$, $\nu_4$, and $\nu_5$ of successive ones of said lenses, starting from the object, are as follows:

TABLE IIb $n_1 > 1.55$
$n_2 > 1.55$
$n_3 > 1.55$
$n_4 > 1.6$
$n_5 < 1.6$ $\nu_1 > 40$
$\nu_2 > 40$
$\nu_3 < 45$
$\nu_4 < 40$
$\nu_5 > 40$

The constructural data for this embodiment are given in the following table:

TABLE III

| Radii | Axial distances and thicknesses | $n_e$ | $\nu_e$ |
|---|---|---|---|
| $r_1 = -6.1$ | $l_0 = 2.932$ | | |
| | $d_1 = 8.51$ | 1.61022 | 49.01 |
| $r_2 = -7.43$ | $l_1 = 0.3$ | | |
| $r_3 = +24.104$ | $d_2 = 2.0$ | 1.61022 | 49.01 |
| $r_4 = -24.104$ | $l_2 = 4.0$ | | |
| $r_5 = -10.898$ | $d_3 = 1.0$ | 1.65221 | 33.64 |
| $r_6 = \infty$ | $l_3 = 22.02$ | | |
| $r_7 = +35.199$ | $d_4 = 1.0$ | 1.76860 | 26.32 |
| $r_8 = +14.851$ | $d_5 = 2.5$ | 1.52554 | 50.68 |
| $r_9 = -20.569$ | $l_1 = 152.74$ | | |

$\beta' e = -6.30$
$f_e = 23.93$
$A = 0.20$
$\Sigma P = +0.0070$
$\Sigma \Gamma = +0.0119$ $\beta' e$ is the total magnification, $f_e$ is the focal length of the objective, A is the aperture, and $\Sigma P$ and $\Sigma \Gamma$ are indices used in Seidel's equation, $\Sigma P$ being Seidel's coefficient for the Petzval sum and $\Sigma \Gamma$ being Seidel's coefficient for astigmatism.

With a focal length $f$ between 10 mm. and 20 mm., the respective focal lengths $f_1$, $f_2$, $f_3$, and $f_4$ and the respective axial distances between the object and the negative meniscus lens, and between successive ones of said lenses $l_0$, $l_1$, $l_2$, and $l_3$ are as follows:

TABLE IV $2.0f < f_1 < 3.0f$
$0.6f < f_2 < 1.2f$
$0.8f < -f_3 < 1.4f$
$1.7f < f_4 < 2.5f$ $0.04f < l_0 < 0.12f$
$0 < l_1 < 0.3f$
$0 < l_2 < 0.4f$
$1.0f < l_3 < 2.0f$

In this embodiment, the successive radii of curvature $r_1$, $r_2$, $r_3$, $r_4$, $r_5$, $r_6$, $r_7$, $r_8$, and $r_9$ and the successive axial thicknesses $d_1$, $d_2$, $d_3$, $d_4$, and $d_5$ of said lenses, starting from the object, are as follows:

TABLE Va $0.25f < d_1 < 0.6f$
$0.05f < d_2 < 0.3f$
$0.03f < d_3 < 0.4f$
$0.1f < (d_4 + d_5) < 0.5f$
$0.1f < -r_1 < 0.35f$
$0.2f < -r_2 < 0.45f$
$0.6f < r_3 < 1.2f$
$1.0f < -r_4 < 1.7f$
$0.4f < -r_5 < 1.0f$
$1.5f < -r_6 < \infty$
$1.5f < r_7 < \infty$
$0.6f < r_8 < 1.2f$
$1.0f < -r_9 < 1.7f$ and the indices of refraction $n_1$, $n_2$, $n_3$, $n_4$, and $n_5$ for the e line of the spectrum and the dispersive indices $\nu_1$, $\nu_2$, $\nu_3$, $\nu_4$, and $\nu_5$ of successive ones of said lenses, starting from the object, are as follows:

TABLE Vb $n_1 > 1.55$
$n_2 > 1.55$
$n_3 > 1.6$
$n_4 > 1.6$
$n_5 < 1.6$ $\nu_1 > 35$
$\nu_2 > 40$
$\nu_3 < 40$
$\nu_4 < 40$
$\nu_5 > 40$

The constructural data for this embodiment are given in the following table:

TABLE VI

| Radii | Axial distances and thicknesses | $n_e$ | $\nu_e$ |
|---|---|---|---|
| $r_1 = -3.16$ | $l_0 = 1.195$ | | |
| | $d_1 = 6.7$ | 1.61075 | 39.97 |
| $r_2 = -5.05$ | $l_1 = 0.3$ | | |
| $r_3 = +14.0$ | $d_2 = 1.7$ | 1.60994 | 56.42 |
| $r_4 = -20.4$ | $l_2 = 1.0$ | | |
| $r_5 = -9.42$ | $d_3 = 1.19$ | 1.79180 | 25.9 |
| $r_6 = -34.197$ | $l_3 = 21.82$ | | |
| $r_7 = +38.832$ | $d_4 = 1.0$ | 1.79180 | 25.9 |
| $r_8 = +13.886$ | $d_5 = 2.5$ | 1.55963 | 48.24 |
| $r_9 = -20.864$ | $l_1 = 159.7$ | | |

$\beta' e = -10.02$
$f_e = 15.80$
$A = 0.25$
$\Sigma P = -0.0106$
$\Sigma \Gamma = +0.0202$ $\beta' e$ is the total magnification, $f_e$ is the focal length of the objective, A is the aperture, and $\Sigma P$ and $\Sigma \Gamma$ are indices used in Seidel's equation as defined above in Table III.

I claim:

1. An anastigmatic medium-power microscope objective having an optical axis and comprising two groups of lenses, the axial distance between the two groups of lenses being at least a third of the axial distance between the object and the apex of the objective lens facing the image projected by the objective, the first one of said groups of lenses next to the object consisting of a negative meniscus lens of considerable axial thickness next to the object, a simple converging lens and a simple diverging lens airspaced from said simple converging lens, and the second group of lenses consisting of a cemented converging doublet lens member, and wherein the axial distance between said simple lenses of the first group of lenses is so selected that the focal point in the direction of the image is positioned at least closely to the doublet lens member.

2. The microscope objective of claim 1, wherein said focal point is positioned within the doublet lens member.

3. The microscope objective of claim 1, wherein the parameters of the lenses are as follows:

TABLE III

| Radii | Axial distances and thicknesses | $n_e$ | $\nu_e$ |
|---|---|---|---|
| $r_1=-6.1$ | $l_0=2.932$ | | |
| $r_2=-7.43$ | $d_1=8.51$ | 1.61022 | 49.01 |
| $r_3=+24.104$ | $l_1=0.3$ | | |
| $r_4=-24.104$ | $d_2=2.0$ | 1.61022 | 49.01 |
| $r_5=-10.898$ | $l_2=4.0$ | | |
| $r_6=\infty$ | $d_3=1.0$ | 1.65221 | 33.64 |
| $r_7=+35.199$ | $l_3=22.02$ | | |
| $r_8=+14.851$ | $d_4=1.0$ | 1.76860 | 26.32 |
| $r_9=-20.569$ | $d_5=2.5$ | 1.52554 | 50.68 |
| | $l_i=152.74$ | | |

$\beta'e=6.30$
$f_e=23.93$
$A=0.20$
$\Sigma P=+0.0070$
$\Sigma \Gamma=+0.0119$ wherein $\beta'e$ is the total magnification, $fe$ is the focal length of the objective, $A$ is the aperture, and $\Sigma P$ and $\Sigma \Gamma$ are indices used in Seidel's equation, $\Sigma P$ being Seidel's coefficient for the Petzval sum and $\Sigma \Gamma$ being Seidel's coefficient for astigmatism.

4. The microscope objective of claim 1, wherein the parameters of the lenses are as follows:

TABLE VI

| Radii | Axial distances and thicknesses | $n_e$ | $\nu_e$ |
|---|---|---|---|
| $r_1=-3.16$ | $l_0=1.195$ | | |
| $r_2=-5.05$ | $d_1=6.7$ | 1.61075 | 39.97 |
| $r_3=+14.0$ | $l_1=0.3$ | | |
| $r_4=-20.4$ | $d_2=1.7$ | 1.60994 | 56.42 |
| $r_5=-9.42$ | $l_2=1.0$ | | |
| $r_6=-34.197$ | $d_3=1.19$ | 1.79180 | 25.9 |
| $r_7=+38.832$ | $l_3=21.82$ | | |
| $r_8=+13.886$ | $d_4=1.0$ | 1.79180 | 25.9 |
| $r_9=-20.864$ | $d_5=2.5$ | 1.55963 | 48.24 |
| | $l_b=159.7$ | | |

$\beta'e=-10.02$
$f_e=15.80$
$A=0.25$
$\Sigma P=-0.0106$
$\Sigma \Gamma=+0.0202$ $\beta'e$ is the total magnification, $f_e$ is the focal length of the objective, A is the aperture, and $\Sigma P$ and $\Sigma \Gamma$ are indices used in Seidel's equation, $\Sigma P$ being Seidel's coefficient for the Petzval sum and $\Sigma \Gamma$ being Seidel's coefficient for astigmatism.

References Cited

UNITED STATES PATENTS 2,713,808   7/1955   Klein _____ 350—216 X

JOHN K. CORBIN, *Primary Examiner.*